United States Patent
Koshiba et al.

(10) Patent No.: US 10,519,848 B2
(45) Date of Patent: Dec. 31, 2019

(54) PRECOMBUSTION-CHAMBER TYPE GAS ENGINE AND OPERATION CONTROL METHOD OF SAME

(71) Applicant: MITSUBISHI HEAVY INDUSTRIES ENGINE & TURBOCHARGER, LTD., Sagamihara-shi, Kanagawa (JP)

(72) Inventors: Yuki Koshiba, Tokyo (JP); Hiroshi Yoshizumi, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 16/070,674

(22) PCT Filed: Dec. 27, 2016

(86) PCT No.: PCT/JP2016/088808
§ 371 (c)(1),
(2) Date: Jul. 17, 2018

(87) PCT Pub. No.: WO2017/126303
PCT Pub. Date: Jul. 27, 2017

(65) Prior Publication Data
US 2019/0032543 A1   Jan. 31, 2019

(30) Foreign Application Priority Data
Jan. 21, 2016   (JP) .................. 2016-009730

(51) Int. Cl.
*F02B 19/10*   (2006.01)
*F02B 19/12*   (2006.01)
(Continued)

(52) U.S. Cl.
CPC .......... *F02B 19/10* (2013.01); *F02B 19/1085* (2013.01); *F02B 19/12* (2013.01);
(Continued)

(58) Field of Classification Search
CPC ...... F02B 19/10; F02B 19/1085; F02B 19/12; F02B 43/00; F02M 21/0218;
(Continued)

(56) References Cited

U.S. PATENT DOCUMENTS

2007/0221164 A1   9/2007   Ashida et al.
2013/0054124 A1   2/2013   Stoll et al.
(Continued)

FOREIGN PATENT DOCUMENTS

JP   7-166937 A    6/1995
JP   2001-193571 A  7/2001
(Continued)

OTHER PUBLICATIONS

International Preliminary Report and Written Opinion of the International Searching Authority (Forms PCT/IB/338, PCT/IB/373, and PCT/ISA/237) for International Application No. PCT/JP2016/088808, dated Aug. 2, 2018, with English translation.

(Continued)

*Primary Examiner* — Xiao En Mo
(74) *Attorney, Agent, or Firm* — Birch, Stewart, Kolasch & Birch, LLP

(57) ABSTRACT

A precombustion-chamber type gas engine, comprising includes: a check valve disposed in the precombustion-chamber gas supply passage and configured to block a backflow of fuel gas from a precombustion chamber; a supply pressure control valve which is disposed on an upstream side of the check valve in the precombustion-chamber gas supply passage and which is capable of adjusting a pressure of the fuel gas to be supplied to the precombustion chamber; a torch strength information acquisition device configured to obtain torch strength information correlated to strength of a torch from the injection nozzle, on the basis of a pressure in the main chamber and a pressure in the (Continued)

precombustion chamber; a precombustion-chamber gas supply amount calculation device configured to calculate an amount of the fuel gas to be supplied to a precombustion-chamber gas supply amount, on the basis of the torch strength information and correlation information representing a correlation between the torch strength information, a thermal efficiency, and the precombustion-chamber gas supply amount; and a precombustion-chamber gas supply pressure control device configured to control the supply pressure control valve on the basis of the precombustion-chamber gas supply amount calculated by the precombustion-chamber gas supply amount calculation device.

14 Claims, 8 Drawing Sheets

(51) Int. Cl.
| | | |
|---|---|---|
| *F02M 21/02* | (2006.01) | |
| *F02D 19/02* | (2006.01) | |
| *F02D 35/02* | (2006.01) | |
| *F02D 41/00* | (2006.01) | |
| *F02B 43/00* | (2006.01) | |

(52) U.S. Cl.
CPC ......... *F02D 19/023* (2013.01); *F02D 19/024* (2013.01); *F02D 19/027* (2013.01); *F02D 35/027* (2013.01); *F02D 41/0027* (2013.01); *F02M 21/0218* (2013.01); *F02M 21/0239* (2013.01); *F02M 21/0242* (2013.01); *F02B 43/00* (2013.01); *Y02T 10/125* (2013.01); *Y02T 10/32* (2013.01)

(58) Field of Classification Search
CPC ............ F02M 21/0239; F02M 21/0242; F02D 19/024; F02D 41/0027; F02D 35/027; F02D 19/027; F02D 19/023; Y02T 10/32; Y02T 10/125

See application file for complete search history.

(56) References Cited

U.S. PATENT DOCUMENTS

| | | | |
|---|---|---|---|
| 2015/0028239 A1 | 1/2015 | Terakado et al. | |
| 2015/0267631 A1 | 9/2015 | Miyamoto et al. | |

FOREIGN PATENT DOCUMENTS

| | | | |
|---|---|---|---|
| JP | 2007-198140 A | 8/2007 | |
| JP | 2007-247420 A | 9/2007 | |
| JP | 2007-255370 A | 10/2007 | |
| JP | 2009-221937 A | 10/2009 | |
| JP | 2013-113256 A | 6/2013 | |
| JP | 2014-185574 A | 10/2014 | |
| JP | 2015-151959 A | 8/2015 | |
| WO | WO 2014/049646 A1 | 4/2014 | |

OTHER PUBLICATIONS

International Search Report (Form PCT/ISA/210) for International Application No. PCT/JP2016/088808, dated Mar. 14, 2017.
Office Action dated Apr. 15, 2019 issued to the corresponding Japanese Application No. 2016-009730 with an English Machine Translation.
Office Action dated Aug. 6, 2019 in the corresponding Japanese Application No. 2016-009730 with an English Translation.

PRECOMBUSTION-CHAMBER TYPE GAS ENGINE AND OPERATION CONTROL METHOD OF SAME

TECHNICAL FIELD

The present disclosure relates to a precombustion-chamber type gas engine and an operation control method of the same.

BACKGROUND ART

A precombustion-chamber type gas engine is used as an engine for power generation, for instance. A precombustion-chamber type gas engine includes a main chamber (main combustion chamber) defined between a piston and a cylinder head, and a precombustion chamber which is in communication with the main chamber via an injection nozzle, and performs the following combustion flow.

First, fuel gas is supplied to the precombustion chamber from a precombustion-chamber gas supply passage. Next, lean premixed gas in the main chamber flows into the precombustion chamber via an injection nozzle during the compression stroke and is mixed with fuel gas in the precombustion chamber, and the mixture ratio becomes a stoichiometric mixture ratio immediately before ignition. Further, the ignition plug sparks in the precombustion chamber, and flame propagation combustion occurs in the precombustion chamber. The combustion gas produced in the precombustion chamber is injected into the main chamber via the injection nozzle as a torch, and combusts the air-fuel mixture in the main chamber through torch combustion and flame propagation combustion.

With the above precombustion-chamber type gas engine, combustion of the lean premixed gas in the main chamber is combustion at a relatively low temperature. Thus, it is possible to reduce the generation amount of NOx or the like, and reduce pollution. Further, though the air-fuel mixture in the main chamber is lean premixed gas, a torch having a considerable amount of energy is injected, and thus it is possible to complete combustion in the main chamber quickly.

Patent Document 1 discloses a precombustion-chamber type gas engine as described above, which includes a precombustion-chamber gas supply passage capable of supplying fuel gas from a supply source of fuel gas, a check valve disposed in the precombustion-chamber gas supply passage and configured to block a reverse flow of fuel gas from the precombustion-chamber gas supply passage, and a supply pressure control valve disposed upstream of the check valve in the precombustion-chamber gas supply passage and capable of adjusting the pressure of the fuel gas supplied to the precombustion chamber.

The precombustion-chamber type gas engine disclosed in Patent Document 1 includes a valve-open timing and valve-open period detection device for detecting the valve-open timing and the valve-open period of the check valve, and adjusts the supply pressure of fuel gas on the basis of the detection values of the valve-open timing and the valve-open period, so as to improve operation efficiency and suppress combustion variation.

CITATION LIST

Patent Literature

Patent Document 1: JP2015-151959A

SUMMARY

Problems to be Solved

At least one embodiment of the present invention is a further modification of the above prior art, and an object is to provide a precombustion-chamber type gas engine capable of achieving a high thermal efficiency, and an operation control method of the same.

Solution to the Problems (1) A precombustion-chamber type gas engine according to at least one embodiment of the present invention includes: a main chamber defined between a piston and a cylinder head; a precombustion chamber which is in communication with the main chamber via an injection nozzle; a precombustion-chamber gas supply passage capable of supplying fuel gas to the precombustion chamber from a supply source of the fuel gas not via the main chamber; a check valve disposed in the precombustion-chamber gas supply passage; a supply pressure control valve which is disposed on an upstream side of the check valve in the precombustion-chamber gas supply passage and which is capable of adjusting a pressure of the fuel gas to be supplied to the precombustion chamber; a torch strength information acquisition device configured to obtain torch strength information correlated to strength of a torch from the injection nozzle, on the basis of a pressure in the main chamber and a pressure in the precombustion chamber; a precombustion-chamber gas supply amount calculation device configured to calculate an amount of the fuel gas to be supplied to the precombustion chamber from the precombustion-chamber gas supply passage (hereinafter, referred to as precombustion-chamber gas supply amount), on the basis of the torch strength information obtained by the torch strength information acquisition device and correlation information representing a correlation between the torch strength information, a thermal efficiency, and the precombustion-chamber gas supply amount; and a precombustion-chamber gas supply pressure control device configured to control the supply pressure control valve on the basis of the precombustion-chamber gas supply amount calculated by the precombustion-chamber gas supply amount calculation device.

According to findings by the present inventors, the differential pressure $\Delta P(=P_s-P_m)$ and the ratio $P_s/P_m$ between the pressure $P_s$ in the precombustion chamber and the pressure $P_m$ in the main chamber have a correlation with the strength of a torch injected into the main chamber from the injection nozzle. For instance, the greater the above differential pressure $\Delta P$ or the ratio $P_s/P_m$ is, the stronger the torch is likely to be. Thus, it is possible to estimate the strength of the torch from the injection nozzle on the basis of the pressure $P_m$ in the main chamber and the pressure $P_s$ in the precombustion chamber, and obtain the torch strength information.

Thus, the precombustion-chamber gas supply amount calculation device of the gas engine described in the above (1) is configured to calculate the precombustion-chamber gas supply amount on the basis of the torch strength information obtained on the basis of the pressure in the precombustion chamber and the pressure in the main chamber, and correlation information representing a correlation between the torch strength information, the thermal efficiency of the gas engine, and the precombustion-chamber gas supply amount. Accordingly, the precombustion-chamber gas supply amount calculation device can calculate a precombustion-chamber gas supply amount that realizes a high thermal efficiency, on the basis of the torch strength information and the correlation information.

Thus, the precombustion-chamber gas supply pressure control device can control the precombustion-chamber gas supply pressure so as to achieve a torch strength that realizes a high thermal efficiency even in a configuration where fuel gas is supplied to the precombustion chamber with the check valve, by controlling the supply pressure control valve on the basis of the precombustion-chamber gas supply amount calculated by the precombustion-chamber gas supply amount calculation device. Accordingly, it is possible to improve the thermal efficiency of the engine and suppress combustion variation.

(2) In some embodiments, in the precombustion-chamber type gas engine (1), the torch strength information acquisition device is configured to obtain the torch strength information on the basis of a difference or a ratio between the pressure in the main chamber and the pressure in the precombustion chamber.

With the above precombustion-chamber type gas engine (2), the torch strength information acquisition device can obtain torch strength information that is strongly correlated to the torch strength from the injection nozzle. Accordingly, it is possible to control the torch strength to be a strength that achieves a high thermal efficiency more easily, and thus to enhance the above effect to improve the thermal efficiency of the engine.

(3) In some embodiments, the precombustion-chamber type gas engine (1) or (2) further includes a NOx amount detection device configured to detect a NOx discharge amount. The correlation information is information representing a correlation between the torch strength information, the thermal efficiency, the precombustion-chamber gas supply amount, and the NOx discharge amount. The precombustion-chamber gas supply amount calculation device is configured to calculate the precombustion-chamber gas supply amount within such a range that the NOx discharge amount does not exceed a standard discharge amount, on the basis of the NOx discharge amount detected by the NOx amount detection device, the torch strength information obtained by the torch strength information acquisition device, and the correlation information.

With the above precombustion-chamber type gas engine (3), even in a configuration in which fuel gas is supplied to the precombustion chamber through the check valve, it is possible to control the precombustion-chamber gas supply pressure so as to achieve a torch strength that realizes a high thermal efficiency within such a range that the NOx discharge amount does not exceed the standard discharge amount. Accordingly, it is possible to operate the engine cleanly and efficiently.

(4) In some embodiments, the precombustion-chamber type gas engine according to any one of the above (1) to (3) further includes a combustion variation amount detection device configured to detect a combustion variation amount in the main chamber. The correlation information is information representing a correlation between the torch strength information, the thermal efficiency, the precombustion-chamber gas supply amount, and the combustion variation amount. The precombustion-chamber gas supply amount calculation device is configured to calculate the precombustion-chamber gas supply amount within such a range that the combustion variation amount does not exceed a standard variation amount, on the basis of the combustion variation amount detected by the combustion variation amount detection device, the torch strength information obtained by the torch strength information acquisition device, and the correlation information.

With the above precombustion-chamber type gas engine (4), even in a configuration in which fuel gas is supplied to the precombustion chamber through the check valve, it is possible to control the precombustion-chamber gas supply pressure so as to achieve a torch strength that realizes a high thermal efficiency within such a range that the combustion variation amount does not exceed the standard variation amount. Accordingly, it is possible to operate the engine efficiently while achieving a stable combustion state.

(5) In some embodiments, the precombustion-chamber type gas engine according to any one of the above (1) to (4) further includes a knocking detection device configured to detect a state of knocking. The correlation information is information representing a correlation between the torch strength information, the thermal efficiency, the precombustion-chamber gas supply amount, and the state of knocking. The precombustion-chamber gas supply amount calculation device is configured to calculate the precombustion-chamber gas supply amount within such a range that the state of knocking does not deteriorate from a standard state, on the basis of the state of knocking detected by the knocking detection device, the torch strength information obtained by the torch strength information acquisition device, and the correlation information.

With the above precombustion-chamber type gas engine (5), even in a configuration in which fuel gas is supplied to the precombustion chamber through the check valve, it is possible to control the precombustion-chamber gas supply pressure so as to achieve a torch strength that realizes a high thermal efficiency within such a range that the state of knocking does not deteriorate from the standard state. Accordingly, it is possible to operate the engine efficiently while suppressing damage to the gas engine.

(6) In some embodiments, the precombustion-chamber type gas engine according to any one of the above (1) to (5) further includes an exhaust temperature detection device configured to detect a temperature of exhaust gas from the main chamber. The correlation information is information representing a correlation between the torch strength information, the thermal efficiency, the precombustion-chamber gas supply amount, and the temperature of the exhaust gas. The precombustion-chamber gas supply amount calculation device is configured to calculate the precombustion-chamber gas supply amount within such a range that the temperature of the exhaust gas satisfies a predetermined standard, on the basis of the temperature of the exhaust gas from the main chamber detected by the exhaust temperature detection device, the torch strength information obtained by the torch strength information acquisition device, and the correlation information.

With the above precombustion-chamber type gas engine (6), even in a configuration in which fuel gas is supplied to the precombustion chamber through the check valve, it is possible to control the precombustion-chamber gas supply pressure so as to achieve a torch strength that realizes a high thermal efficiency within such a range that the exhaust temperature satisfies a predetermined standard. Accordingly, it is possible to operate the engine efficiently while suppressing troubles that may be caused by the exhaust temperature.

(7) In some embodiments, the precombustion-chamber type gas engine according to any one of the above (1) to (6) further includes a combustion period detection device configured to detect a combustion period in the main chamber.

The correlation information is information representing a correlation between the torch strength information, the thermal efficiency, the precombustion-chamber gas supply amount, and the combustion period. The precombustion-chamber gas supply amount calculation device is configured to calculate the precombustion-chamber gas supply amount within such a range that the combustion period satisfies a predetermined standard, on the basis of the combustion period detected by the combustion period detection device, the torch strength information obtained by the torch strength information acquisition device, and the correlation information.

With the above precombustion-chamber type gas engine (7), even in a configuration in which fuel gas is supplied to the precombustion chamber through the check valve, it is possible to control the precombustion-chamber gas supply pressure so as to achieve a torch strength that realizes a high thermal efficiency within such a range that the combustion period satisfies a predetermined standard. Accordingly, it is possible to operate the engine efficiently while suppressing troubles that may be caused by the combustion period.

(8) According to at least one embodiment of the present invention, a method of controlling operation of a precombustion-chamber type gas engine which includes: a main chamber defined between a piston and a cylinder head; a precombustion chamber which is in communication with the main chamber via an injection nozzle; a precombustion-chamber gas supply passage capable of supplying fuel gas to the precombustion chamber from a supply source of the fuel gas not via the main chamber; a check valve disposed in the precombustion-chamber gas supply passage; and a supply pressure control valve which is disposed on an upstream side of the check valve in the precombustion-chamber gas supply passage and which is capable of adjusting a pressure of the fuel gas to be supplied to the precombustion chamber, includes: a torch strength information acquisition step of obtaining torch strength information correlated to strength of a torch from the injection nozzle, on the basis of a pressure in the main chamber and a pressure in the precombustion chamber; a precombustion-chamber gas supply amount calculation step of calculating an amount of the fuel gas to be supplied to the precombustion chamber from the precombustion-chamber gas supply passage (hereinafter, referred to as precombustion-chamber gas supply amount), on the basis of the torch strength information obtained by the torch strength information acquisition device and correlation information representing a correlation between the torch strength information, a thermal efficiency, and the precombustion-chamber gas supply amount; and a precombustion-chamber gas supply pressure control step of controlling the supply pressure control valve on the basis of the precombustion-chamber gas supply amount calculated in the precombustion-chamber gas supply amount calculation step.

According to findings by the present inventors, the differential pressure $\Delta P(=Ps-Pm)$ and the ratio $Ps/Pm$ between the pressure $Ps$ in the precombustion chamber and the pressure $Pm$ in the main chamber have a correlation with the strength of a torch injected into the main chamber from the injection nozzle. For instance, the greater the above differential pressure $\Delta P$ or the ratio $Ps/Pm$ is, the stronger the torch is likely to be. Thus, it is possible to estimate the strength of the torch from the injection nozzle on the basis of the pressure $Pm$ in the main chamber and the pressure $Ps$ in the precombustion chamber, and obtain the torch strength information.

Thus, in the precombustion-chamber gas supply amount calculation step of the method of controlling operation of the gas engine described in the above (8), the precombustion-chamber gas supply amount is calculated on the basis of the torch strength information obtained on the basis of the pressure in the precombustion chamber and the pressure in the main chamber, and correlation information representing a correlation between the torch strength information, the thermal efficiency of the gas engine, and the precombustion-chamber gas supply amount. Accordingly, in the precombustion-chamber gas supply amount calculation step, it is possible to calculate a precombustion-chamber gas supply amount at which thermal efficiency becomes high, on the basis of the torch strength information and the correlation information.

Thus, in the precombustion-chamber gas supply pressure control step, it is possible to control the precombustion-chamber gas supply pressure so as to achieve a torch strength that realizes a high thermal efficiency even in a configuration where fuel gas is supplied to the precombustion chamber with the check valve, by controlling the supply pressure control valve on the basis of the precombustion-chamber gas supply amount calculated by the precombustion-chamber gas supply amount calculation device. Accordingly, it is possible to improve the thermal efficiency of the engine and suppress combustion variation.

(9) In some embodiments, in the above method of controlling operation of a precombustion-chamber type gas engine (8), the torch strength information acquisition step includes obtaining the torch strength information on the basis of a difference or a ratio between the pressure in the main chamber and the pressure in the precombustion chamber.

According to the method of controlling operation of the precombustion-chamber type gas engine (9), in the torch strength information acquisition step, it is possible to obtain torch strength information that is strongly correlated to the strength of a torch from the injection nozzle. Accordingly, it is possible to control the torch strength to be a strength that achieves a high thermal efficiency more easily, and thus to enhance the above effect to improve the thermal efficiency of the engine.

(10) In some embodiments, the above method of controlling operation of a precombustion-chamber type gas engine (8) or (9) further includes a NOx amount detection step of detecting a NOx discharge amount. The correlation information is information representing a correlation between the torch strength information, the thermal efficiency, the precombustion-chamber gas supply amount, and the NOx discharge amount. The precombustion-chamber gas supply amount calculation step includes calculating the precombustion-chamber gas supply amount within such a range that the NOx discharge amount does not exceed a standard discharge amount, on the basis of the NOx discharge amount detected in the NOx amount detection step, the torch strength information obtained in the torch strength information acquisition step, and the correlation information.

According to the above method of controlling operation of the precombustion-chamber type gas engine (10), even in a configuration in which fuel gas is supplied to the precombustion chamber through the check valve, it is possible to control the precombustion-chamber gas supply pressure so as to achieve a torch strength that realizes a high thermal efficiency within such a range that the NOx discharge amount does not exceed the standard discharge amount. Accordingly, it is possible to operate the engine cleanly and efficiently.

(11) In some embodiments, the method of controlling operation of a precombustion-chamber type gas engine according to any one of the above (8) to (10) further includes a combustion variation amount detection step of detecting a combustion variation amount in the main chamber. The correlation information is information representing a correlation between the torch strength information, the thermal efficiency, the precombustion-chamber gas supply amount, and the combustion variation amount. The precombustion-chamber gas supply amount calculation step includes calculating the precombustion-chamber gas supply amount within such a range that the combustion variation amount does not exceed a standard variation amount, on the basis of the combustion variation amount detected in the combustion variation amount detection step, the torch strength information obtained in the torch strength information acquisition step, and the correlation information.

According to the above method of controlling operation of the precombustion-chamber type gas engine (11), even in a configuration in which fuel gas is supplied to the precombustion chamber through the check valve, it is possible to control the precombustion-chamber gas supply pressure so as to achieve a torch strength that realizes a higher thermal efficiency within such a range that the combustion variation amount does not exceed the standard variation amount. Accordingly, it is possible to operate the engine efficiently while achieving a stable combustion state.

(12) In some embodiments, the method of controlling operation of a precombustion-chamber type gas engine according to any one of the above (8) to (11) further includes a knocking detection step of detecting a state of knocking. The correlation information is information representing a correlation between the torch strength information, the thermal efficiency, the precombustion-chamber gas supply amount, and the state of knocking. The precombustion-chamber gas supply amount calculation step includes calculating the precombustion-chamber gas supply amount within such a range that the state of knocking does not deteriorate from a standard state, on the basis of the state of knocking detected in the knocking detection step, the torch strength information obtained in the torch strength information acquisition step, and the correlation information.

According to the above method of controlling operation of the precombustion-chamber type gas engine (12), even in a configuration in which fuel gas is supplied to the precombustion chamber through the check valve, it is possible to control the precombustion-chamber gas supply pressure so as to achieve a torch strength that realizes a higher thermal efficiency within such a range that the state of knocking does not deteriorate from the standard state. Accordingly, it is possible to operate the engine efficiently while suppressing damage to the gas engine.

(13) In some embodiments, the method of controlling operation of a precombustion-chamber type gas engine according to any one of the above (8) to (12) further includes an exhaust temperature detection step of detecting a temperature of exhaust gas from the main chamber. The correlation information is information representing a correlation between the torch strength information, the thermal efficiency, the precombustion-chamber gas supply amount, and the temperature of the exhaust gas. The precombustion-chamber gas supply amount calculation step includes calculating the precombustion-chamber gas supply amount within such a range that the temperature of the exhaust gas satisfies a predetermined standard, on the basis of the temperature of the exhaust gas from the main chamber detected in the exhaust temperature detection step, the torch strength information obtained in the torch strength information acquisition step, and the correlation information.

According to the above method of controlling operation of the precombustion-chamber type gas engine (13), even in a configuration in which fuel gas is supplied to the precombustion chamber through the check valve, it is possible to control the precombustion-chamber gas supply pressure so as to achieve a torch strength that realizes a higher thermal efficiency within such a range that the exhaust temperature satisfies a predetermined standard. Accordingly, it is possible to operate the engine efficiently while suppressing troubles that may be caused by the exhaust temperature.

(14) In some embodiments, the method of controlling operation of a precombustion-chamber type gas engine according to any one of the above (8) to (13) further includes a combustion period detection step of detecting a combustion period in the main chamber. The correlation information is information representing a correlation between the torch strength information, the thermal efficiency, the precombustion-chamber gas supply amount, and the combustion period. The precombustion-chamber gas supply amount calculation step includes calculating the precombustion-chamber gas supply amount within such a range that the combustion period satisfies a predetermined standard, on the basis of the combustion period detected in the combustion period detection step, the torch strength information obtained in the torch strength information acquisition step, and the correlation information.

According to the above method of controlling operation of the precombustion-chamber type gas engine (14), even in a configuration in which fuel gas is supplied to the precombustion chamber through the check valve, it is possible to control the precombustion-chamber gas supply pressure so as to achieve a torch strength that realizes the highest thermal efficiency within such a range that the combustion period satisfies a predetermined standard. Accordingly, it is possible to operate the engine efficiently while suppressing troubles that may be caused by the combustion period.

Advantageous Effects

According to at least one embodiment of the present invention, provided is a precombustion-chamber type gas engine capable of achieving a high thermal efficiency and an operation control method of the same.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

On the other hand, an expression such as "comprise", "include", "have", "contain" and "constitute" are not intended to be exclusive of other components.

Figure 1:
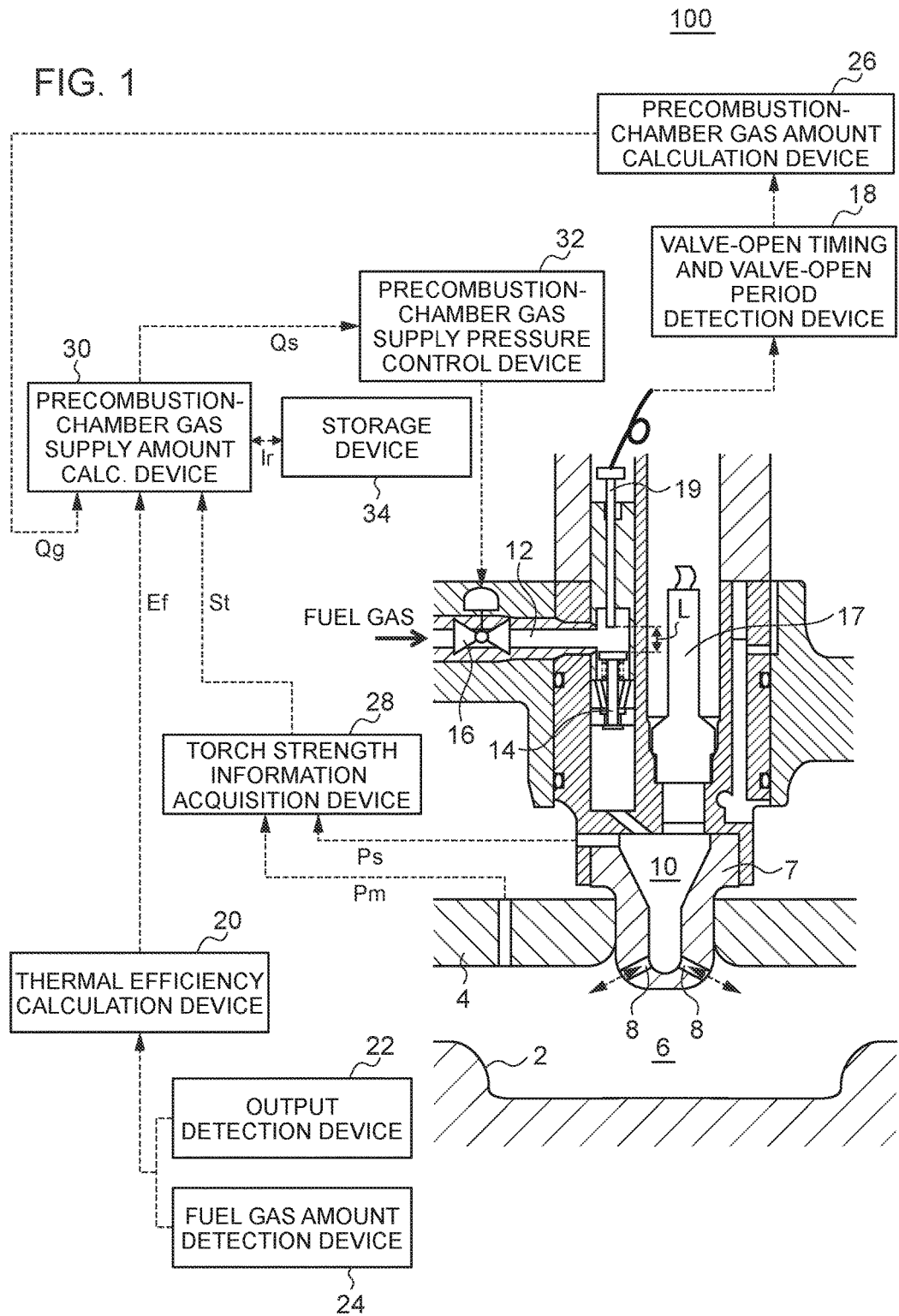
FIG. 1 is a schematic configuration diagram of a precombustion-chamber type gas engine 100 according to an embodiment.

FIG. 1 is a schematic configuration diagram of a precombustion-chamber type gas engine 100 according to an embodiment of the present invention. The gas engine 100 includes a main chamber 6 defined between a piston 2 and a cylinder head 4, and a precombustion chamber 10 which is in communication with the main chamber 6 via an injection nozzle 8 formed on a precombustion chamber cap 7.

In an embodiment, as shown in FIG. 1 for instance, the gas engine 100 includes a precombustion-chamber gas supply passage 12, a check valve 14, a supply pressure control valve 16, an ignition plug 17, a valve-open timing and valve-open period detection device 18, a thermal efficiency calculation device 20, an output detection device 22, a fuel gas amount detection device 24, a precombustion-chamber gas amount calculation device 26, a torch strength information acquisition device 28, a precombustion-chamber gas supply amount calculation device 30, a precombustion-chamber gas supply pressure control device 32, and a storage device 34, for instance.

The precombustion-chamber gas supply passage 12 is configured to be capable of supplying fuel gas for ignition to the precombustion chamber 10, without causing the fuel gas to pass through the main chamber 6, from a fuel gas supply source (not shown). Further, the main chamber 6 is supplied with mixed gas of fuel gas and air for combustion (lean premixed gas) through an air-supply port (not shown).

The check valve 14 is disposed in the precombustion-chamber gas supply passage 12, and is configured to permit a flow of fuel gas from the fuel gas supply source to the precombustion chamber 10, so that the fuel gas does not flow backward from the precombustion chamber 10 toward the fuel gas supply source. The valve body of the check valve is biased toward the valve-close side with a spring, and is configured to move to the valve-open position against the biasing force of the spring when the differential pressure between the supply pressure of fuel gas and the pressure inside the precombustion chamber 10 (differential pressure across the valve body) exceeds a predetermined differential pressure, Thus, the check valve 14 opens during an intake stroke where the pressure in the precombustion chamber 10 is low and the differential pressure between the fuel gas supply pressure and the pressure in the precombustion chamber 10 is high to permit supply of fuel gas to the precombustion chamber 10. On the other hand, the check valve 14 closes during a combustion stroke and an exhaust stroke in which the pressure in the precombustion chamber 10 is high and the differential pressure between the fuel gas supply pressure and the pressure in the precombustion chamber 10 is low, to block a back flow of fuel gas to the fuel gas supply source (not shown) from the precombustion chamber 10. As described above, the valve-open period of the check valve 14 is determined by the differential pressure between the supply pressure of fuel gas and the pressure in the precombustion chamber 10. Furthermore, the differential pressure between the fuel gas supply pressure and the pressure in the precombustion chamber 10 may exceed a predetermined differential pressure. In this case, the check valve 14 opens not only in the intake stroke, but also in a part of the exhaust stroke, to permit supply of fuel gas to the precombustion chamber 10.

The supply pressure control valve 16 is disposed on the upstream side of the check valve 14 in the precombustion-chamber gas supply passage 12, and is configured to be capable of changing the pressure of fuel gas supplied to the precombustion chamber 10 (precombustion-chamber gas supply pressure) by changing the opening degree in accordance with the opening degree signal transmitted from the precombustion-chamber gas supply pressure control device 32. That is, the fuel gas supplied at a constant pressure to the upstream side of the supply pressure control valve 16 in the precombustion-chamber gas supply passage 12 from the fuel gas supply source has its pressure adjusted at the downstream side of the supply pressure control valve 16 in accordance with the opening degree of the supply pressure control valve 16. Further, in accordance with the pressure adjustment, the amount of fuel gas supplied to the precombustion chamber 10 from the precombustion-chamber gas supply passage 12 (hereinafter, referred to as "precombustion-chamber gas supply amount") is adjusted.

The ignition plug 17 is disposed in the precombustion chamber 10. Further, as the ignition plug sparks in the precombustion chamber 10, mixture of fuel gas supplied to the precombustion chamber 10 from the precombustion-chamber gas supply passage 12 and lean mixed gas flowing from the main chamber 6 via the injection nozzle 8 is ignited, and thereby a torch is produced.

The valve-open timing and valve-open period detection device 18 detects (measures) the valve-open timing and the valve-open period in the open-close operation of the check valve 14 by using a gap sensor 19, for instance. That is, the valve body of the check valve 14 is moved by the open-close operation, and the valve-open timing and valve-open period detection device 18 measures the distance L to the valve body continuously with the gap sensor 19 such as an eddy-current type displacement sensor, and detects the valve-open timing and the valve-open period of the check valve 14 from a change in the measurement value. Further, if the gas engine 100 includes a plurality of cylinders, the valve-open timing and valve-open period detection device 18 may be provided for all of the cylinders, or one representative cylinder selected from the plurality of cylinders.

The thermal efficiency calculation device 20 calculates the thermal efficiency of the gas engine 100 on the basis of the outlet value of the gas engine 100 detected by the output detection device 22 and the fuel gas amount detected by the fuel gas amount detection device 24.

The output detection device 22 detects an output value or the like of a generator coupled to the gas engine 100, for instance, as the output of the gas engine 100.

The fuel gas amount detection device 24 detects a sum of the fuel gas amount supplied to the main chamber 6 and the precombustion-chamber gas amount supplied to the precombustion chamber 10. Further, in some embodiments, the fuel gas amount detection device 24 is configured to detect only the fuel gas amount supplied to the main chamber 6.

The precombustion-chamber gas amount calculation device 26 calculates a fuel gas amount Qg actually supplied to the precombustion chamber 10 from the precombustion-chamber gas supply passage 12 (hereinafter, referred to as "precombustion-chamber gas amount"), on the basis of the valve-open timing and the valve-open period of the check valve 14 detected by the valve-open timing and valve-open period detection device 18, and if necessary, referring to the engine rotation speed, the load signal (kw signal), the fuel characteristics and the ambient temperature.

The torch strength information acquisition device 28 is configured to obtain the torch strength information St correlated to the strength of the torch from the injection nozzle 8, on the basis of the pressure Pm in the main chamber 6 (hereinafter, also referred to as "inner pressure") and the pressure Ps in the precombustion chamber 10.

According to findings by the present inventors, the differential pressure $\Delta P(=Ps-Pm)$ and the ratio Ps/Pm between the pressure Ps in the precombustion chamber 10 and the pressure Pm in the main chamber 6 have a correlation with the strength of a torch injected into the main chamber 6 from the injection nozzle 8. For instance, the greater the above differential pressure $\Delta P$ or the ratio Ps/Pm is, the stronger the torch is likely to be. Thus, it is possible to estimate the strength of the torch from the injection nozzle 8 on the basis of the pressure Pm in the main chamber 6 and the pressure Ps in the precombustion chamber 10, and obtain the torch strength information St.

Thus, the precombustion-chamber gas supply amount calculation device 30 is configured to calculate the precombustion-chamber gas supply amount Qs on the basis of the torch strength information St obtained on the basis of the pressure Ps in the precombustion chamber 10 and the pressure Pm in the main chamber 6, and correlation information Ir representing a correlation between the torch strength information St, the thermal efficiency Ef of the gas engine 100, and the amount Qs of fuel gas supplied to the precombustion chamber 10 from the precombustion-chamber gas supply passage 12 (hereinafter, referred to as "precombustion-chamber gas supply amount"). Accordingly, the precombustion-chamber gas supply amount calculation device 30 can calculate a precombustion-chamber gas supply amount Qs for achieving the highest thermal efficiency, on the basis of the torch strength information St and the correlation information Ir.

Thus, the precombustion-chamber gas supply pressure control device 32 can control the precombustion-chamber gas supply pressure so as to achieve a torch strength that realizes the highest thermal efficiency even in a configuration where fuel gas is supplied to the precombustion chamber 10 with the check valve 14, by controlling the supply pressure control valve 16 on the basis of the precombustion-chamber gas supply amount Qs calculated by the precombustion-chamber gas supply amount calculation device 30. Accordingly, it is possible to improve the thermal efficiency of the engine at rated conditions, and suppress combustion variation.

Further, in the embodiment shown in the drawings, the storage device 34 stores the correlation information Ir (e.g. three-dimensional mapping information) representing a correlation between the torch strength information St, the thermal efficiency Ef, and the precombustion-chamber gas supply amount Qs. Further, the precombustion-chamber gas supply amount calculation device 30 receives the precombustion-chamber gas amount Qg from the precombustion-chamber gas amount calculation device 26, the torch strength information St from the torch strength information acquisition device 28, and the correlation information Ir from the storage device 34, and thereby feedbacks a precombustion-chamber gas supply amount Qs for achieving the highest thermal efficiency. Further, the thermal efficiency Ef and the torch strength information St corresponding to the precombustion-chamber gas supply amount Qs obtained by feedback are stored in the storage device 34 as correlation information Ir in succession. As described above, the precombustion-chamber gas supply amount calculation device 30 generates the correlation information Ir real-time during operation of the gas engine 100, and updates the correlation information Ir stored in the storage device 34, on the basis of the information obtained by feedback.

With the above gas engine 100, it is possible to determine the precombustion-chamber gas supply amount Qs real-time so as to achieve the highest thermal efficiency taking into account the torch strength information St. Thus, for instance, even if the state of fuel gas (e.g. heat quantity) changes due to variation of composition of fuel gas or temperature change, it is possible to control the precombustion-chamber gas supply pressure so as to maintain a high thermal efficiency constantly while operating the gas engine. Thus, it is possible to address fuel gas having different heat quantities and temperature condition variation or the like upon operation without changing the specification of the gas engine each time, which makes it possible to provide a gas engine that can cover many geographic areas and operational conditions. Further, it is also possible to address temperature variation (density variation) of fuel gas and humidity variation (air humidity variation) of lean premixed gas due to change of seasons, which makes it possible to obtain a high thermal efficiency stably through the year.

Meanwhile, the above described gas engine 100 can adjust the precombustion-chamber gas supply pressure appropriately taking into account the torch strength information St and the correlation information Ir, even at the time of start of the engine (startup), operation at a low rotation speed, and operation at a low load, for instance. During the startup of the gas engine 100, it is possible to start the gas engine 100 smoothly by increasing the precombustion-chamber gas supply pressure gradually in accordance with the torch strength information St.

Thus, during startup of the gas engine 100, it is possible to reduce the startup time and the fuel gas consumption amount, and start the engine stably. Further, with the gas engine performing the above control, it is possible to improve the thermal efficiency of the gas engine and suppress combustion variation, at the time of operation at a low rotation speed and a low load.

Figure 2:
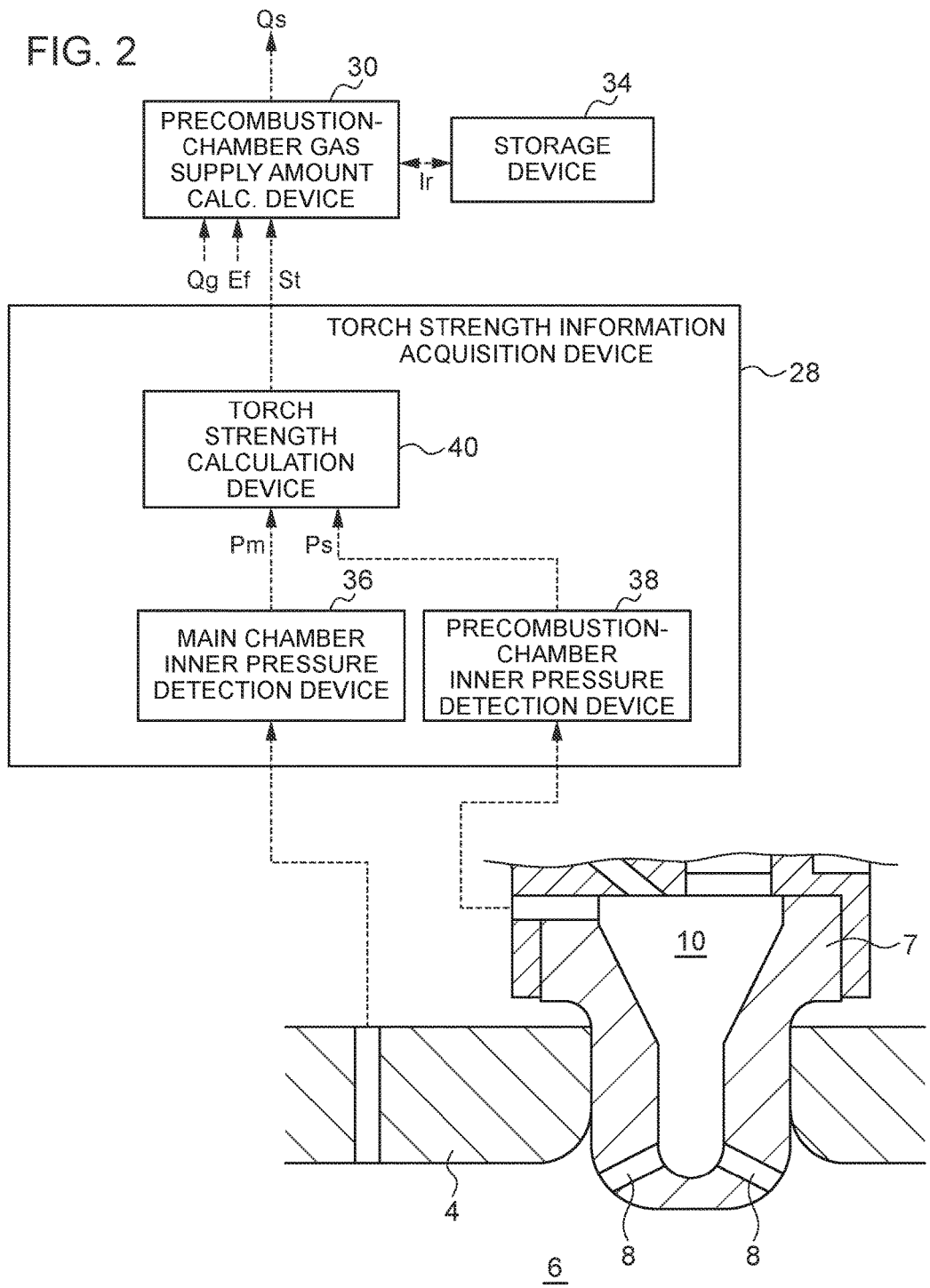
FIG. 2 is a schematic configuration diagram of a part of a precombustion-chamber type gas engine 100 according to an embodiment.

In an embodiment, as shown in FIG. 2 for instance, the torch strength information acquisition device 28 may include a main chamber inner pressure detection device 36 which detects the pressure Pm in the main chamber 6, a precombustion chamber inner pressure detection device 38 which detects the pressure Ps in the precombustion chamber 10, and a torch strength calculation device 40. In this case, the torch strength calculation device 40 calculates the torch strength information St correlated to the strength of a torch from the injection nozzle 8, on the basis of the pressure Pm in the main chamber 6 detected by the main chamber inner pressure detection device 36 and the pressure Ps in the precombustion chamber 10 detected by the precombustion chamber inner pressure detection device 38.

In the embodiment shown in FIG. 2, the torch strength calculation device 40 may calculate the torch strength information St on the basis of the differential pressure $\Delta P(=Ps-Pm)$ between the pressure Pm in the main chamber 6 detected by the main chamber inner pressure detection device 36 and the pressure Ps in the precombustion chamber 10 detected by the precombustion chamber inner pressure detection device 38, or the ratio Ps/Pm between the pressure Pm in the main chamber 6 detected by the main chamber inner pressure detection device 36 and the pressure Ps in the precombustion chamber 10 detected by the precombustion chamber inner pressure detection device 38. Accordingly, it is possible to obtain torch strength information St that is strongly correlated to the torch strength. Thus, it is possible to control the torch strength to be a strength that achieves a high thermal efficiency more easily, and thus to enhance the above effect to improve the thermal efficiency of the engine.

In the embodiment shown in FIG. 2, preferably, the torch strength calculation device 40 may obtain, as the torch strength information St, the maximum value of the differential pressure $\Delta P(=Ps-Pm)$ between the pressure Pm in the main chamber 6 detected by the main chamber inner pressure detection device 36 and the pressure Ps in the precombustion chamber 10 detected by the precombustion chamber inner pressure detection device 38, or the maximum of the ratio Ps/Pm between the pressure Pm in the main chamber 6 detected by the main chamber inner pressure detection device 36 and the pressure Ps in the precombustion chamber 10 detected by the precombustion chamber inner pressure detection device 38. Further, in some embodiments, the torch strength calculation device 40 may obtain, as the torch strength information St, the differential pressure $\Delta P(=Ps-Pm)$ or the ratio Ps/Pm between the pressure Ps in the precombustion chamber 10 and the pressure Pn in the main chamber 6 at a predetermined timing immediately after ignition by the ignition plug 17. Accordingly, it is possible to obtain torch strength information St that is strongly correlated to the torch strength. Thus, it is possible to control the torch strength to be a strength that achieves a high thermal efficiency more easily, and thus to enhance the above effect to improve the thermal efficiency of the engine even further.

Figure 3:
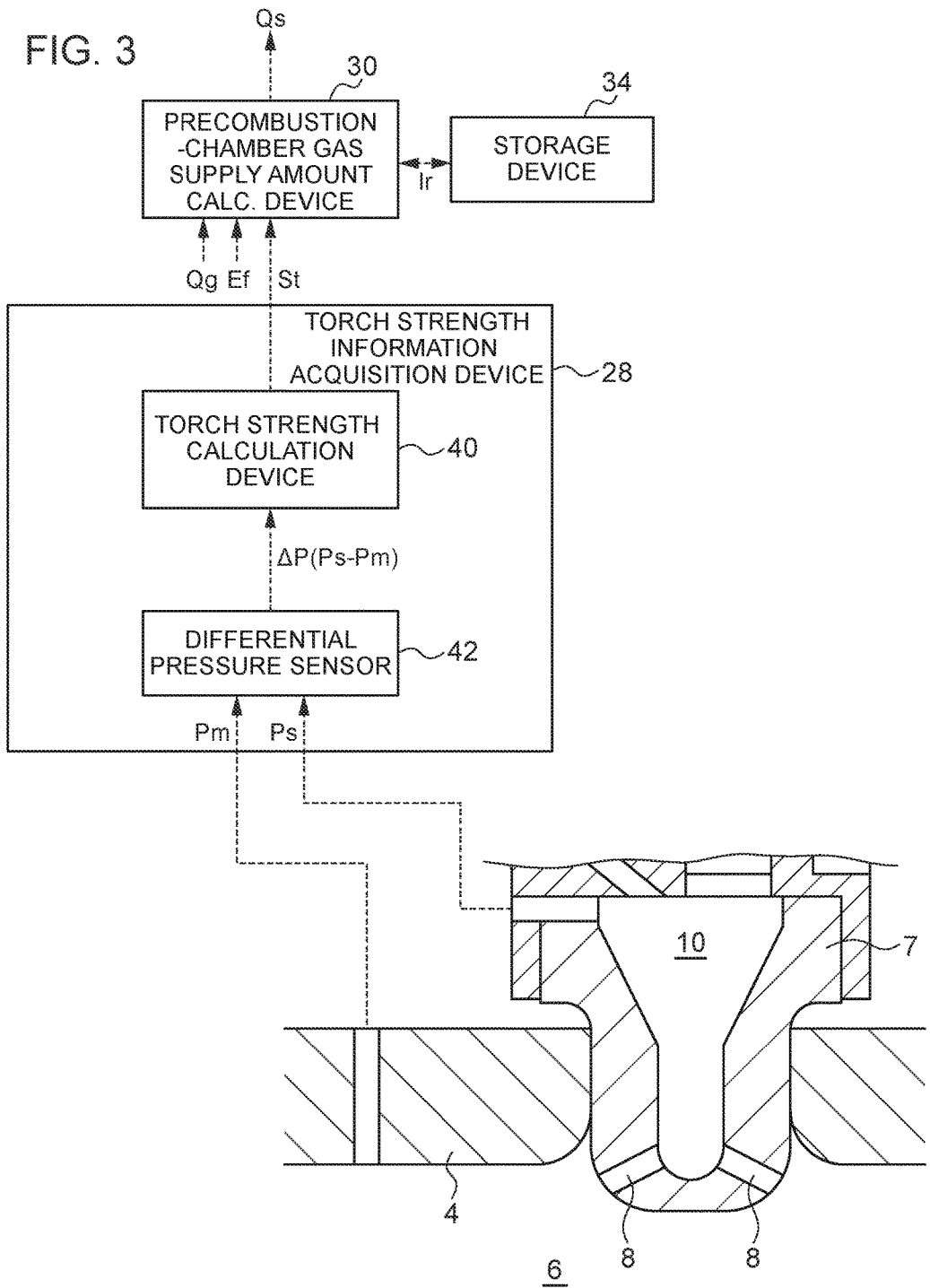
FIG. 3 is a schematic configuration diagram of a part of a precombustion-chamber type gas engine 100 according to an embodiment.

In an embodiment, as shown in FIG. 3 for instance, the torch strength information acquisition device 28 may include a differential pressure sensor 42 which detects the differential pressure $\Delta P(=Ps-Pm)$ between the pressure Ps in the precombustion chamber 10 and the pressure Pm in the main chamber 6, and a torch strength calculation device 40.

In the embodiment shown in FIG. 3, the torch strength calculation device 40 calculates the torch strength information St on the basis of the differential pressure $\Delta P(=Ps-Pm)$ between the pressure Ps in the precombustion chamber 10 and the pressure Pm in the main chamber 6 detected by the differential pressure sensor 42. Accordingly, it is possible to obtain torch strength information St that is strongly correlated to the torch strength. Thus, it is possible to control the torch strength to be a strength that achieves a high thermal efficiency more easily, and thus to enhance the above effect to improve the thermal efficiency of the engine.

In the embodiment shown in FIG. 3, preferably, the torch strength calculation device 40 obtains, as the torch strength information St, the maximum value of the differential pressure $\Delta P(=Ps-Pm)$ between the pressure Ps in the precombustion chamber 10 and the pressure Pm in the main chamber 6 detected by the differential pressure sensor 42. Accordingly, it is possible to obtain torch strength information St that is strongly correlated to the torch strength. Thus, it is possible to control the torch strength to be a strength that achieves a high thermal efficiency more easily, and thus to enhance the above effect to improve the thermal efficiency of the engine even further.

Figure 4:
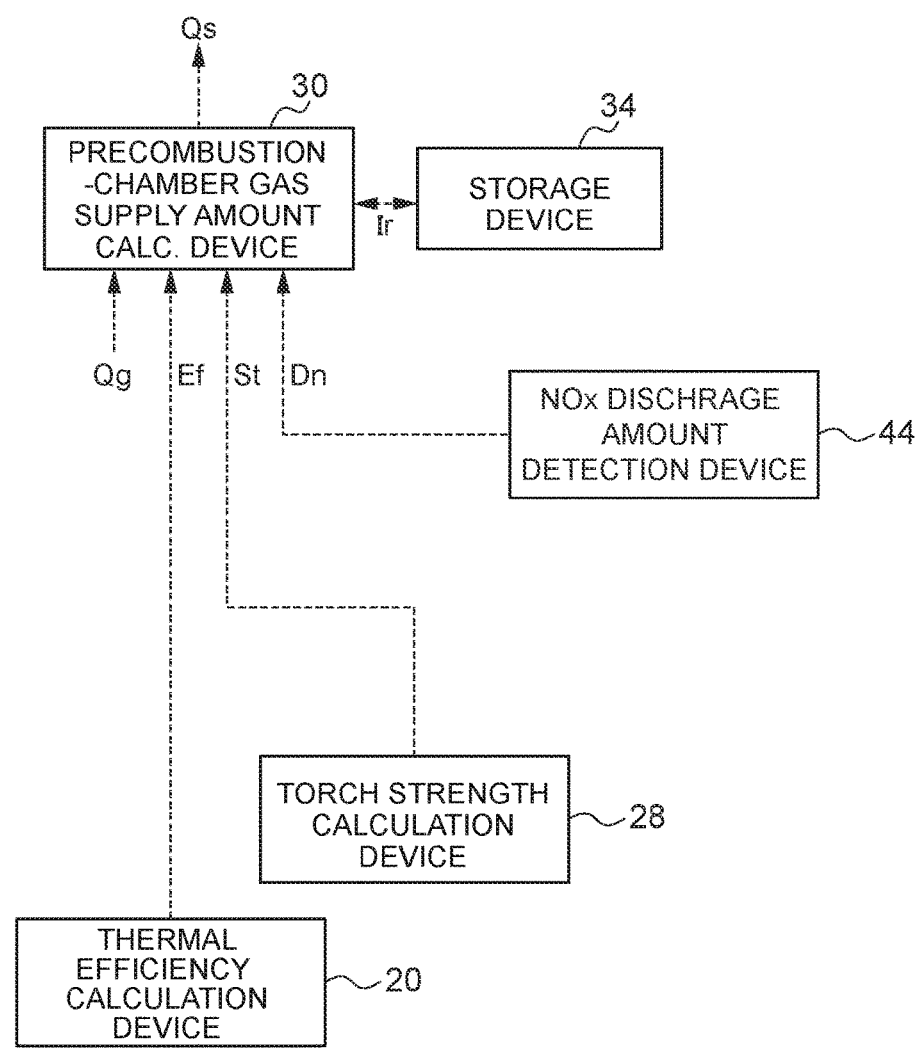
FIG. 4 is a schematic configuration diagram of a part of a precombustion-chamber type gas engine 100 according to an embodiment.

In an embodiment, as shown in FIG. 4, the precombustion-chamber gas supply amount calculation device 30 is configured to calculate the precombustion-chamber gas supply amount so that the thermal efficiency becomes highest within such a range that the NOx discharge amount Dn does not exceed a standard discharge amount, on the basis of the NOx discharge amount Dn detected by the NOx amount detection device 44 provided for the gas engine 100, the torch strength information St obtained by the torch strength information acquisition device 28, and the correlation information Ir. In this case, the correlation information Ir is information representing a correlation between the torch strength information St, the thermal efficiency Ef, the precombustion-chamber gas supply amount Qs, and the NOx discharge amount Dn.

With the above configuration, even in a configuration in which fuel gas is supplied to the precombustion chamber through the check valve 14, it is possible to control the precombustion-chamber gas supply pressure so as to achieve a torch strength that realizes the highest thermal efficiency within such a range that the NOx discharge amount does not exceed the standard discharge amount. Accordingly, it is possible to operate the engine cleanly and efficiently.

In the embodiment shown in FIG. 4, the storage device 34 stores the correlation information Ir representing a correlation between the torch strength information St, the thermal efficiency Ef, the precombustion-chamber gas supply amount Qs, and the NOx discharge amount Dn. The precombustion-chamber gas supply amount calculation device 30 receives the precombustion-chamber gas amount Qg from the precombustion-chamber gas amount calculation device 26, the torch strength information St from the torch strength information acquisition device 28, and the correlation information Ir from the storage device 34, and thereby feedbacks a precombustion-chamber gas supply amount Qs for achieving the highest thermal efficiency, within such a range that the NOx discharge amount does not exceed the standard amount. Further, the precombustion-chamber gas supply amount Qs obtained by feedback, as well as the thermal efficiency Ef, the torch strength information St, and the NOx discharge amount Dn corresponding thereto are stored in the storage device 34 as correlation information Ir in succession. As described above, the precombustion-chamber gas supply amount calculation device 30 generates the correlation information Ir real-time during operation of the gas engine 100, and updates the correlation information Ir stored in the storage device 34, on the basis of the information obtained by feedback.

With the above gas engine 100, it is possible to determine the precombustion-chamber gas supply amount Qs real-time so as to achieve the highest thermal efficiency taking into account the torch strength information St within such a range that the NOx discharge amount Dn does not exceed the standard discharge amount. Thus, for instance, even if the state of fuel gas (e.g. heat quantity) changes due to variation of composition of fuel gas or temperature change, it is possible to control the precombustion-chamber gas supply pressure so as to maintain a high thermal efficiency constantly while operating the gas engine.

Figure 5:
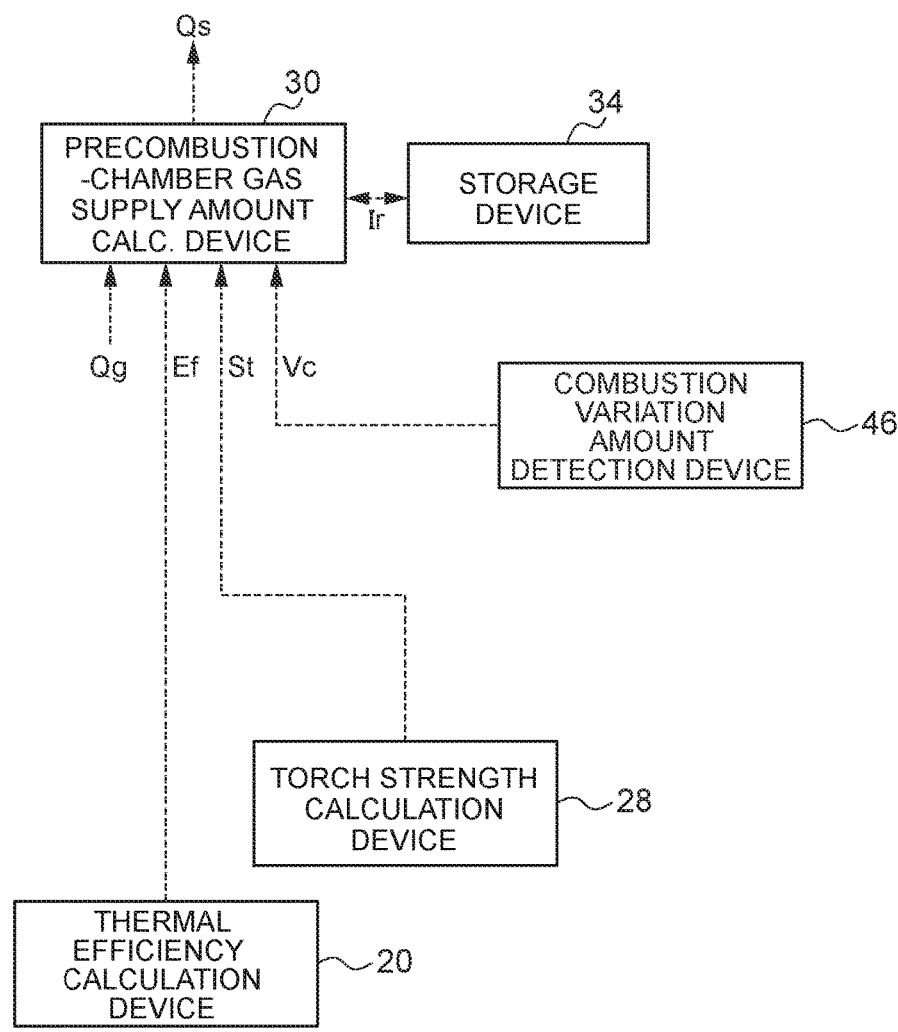
FIG. 5 is a schematic configuration diagram of a part of a precombustion-chamber type gas engine 100 according to an embodiment.

In an embodiment, as shown in FIG. 5, the precombustion-chamber gas supply amount calculation device 30 is configured to calculate the precombustion-chamber gas supply amount so that the thermal efficiency becomes highest within such a range that the combustion variation amount Vc does not exceed a standard variation amount, on the basis of the combustion variation amount Vc detected by the combustion variation amount detection device 46 provided for the gas engine 100, the torch strength information St obtained by the torch strength information acquisition device 28, and the correlation information Ir. In this case, the correlation information Ir is information representing a correlation between the torch strength information St, the thermal efficiency Ef, the precombustion-chamber gas supply amount Qs, and the combustion variation amount Vc. The combustion variation amount detection device 46 detects the combustion variation amount Vc on the basis of variation of the in-cylinder pressure, for instance.

With the above configuration, even in a configuration in which fuel gas is supplied to the precombustion chamber through the check valve 14, it is possible to control the precombustion-chamber gas supply pressure so as to achieve a torch strength that realizes the highest thermal efficiency within such a range that the combustion variation amount Vc does not exceed the standard variation amount. Accordingly, it is possible to operate the engine efficiently while achieving a stable combustion state.

In the embodiment shown in FIG. 5, the storage device 34 stores the correlation information Ir representing a correlation between the torch strength information St, the thermal efficiency Ef, the precombustion-chamber gas supply amount Qs, and the combustion variation amount Vc. The precombustion-chamber gas supply amount calculation device 30 receives the precombustion-chamber gas amount Qg from the precombustion-chamber gas amount calculation device 26, the torch strength information St from the torch strength information acquisition device 28, and the correlation information Ir from the storage device 34, and thereby feedbacks a precombustion-chamber gas supply amount Qs for achieving the highest thermal efficiency, within such a range that the combustion variation amount Vc does not exceed the standard variation amount. Further, the precombustion-chamber gas supply amount Qs obtained by feedback, as well as the thermal efficiency Ef, the torch strength information St, and the combustion variation amount Vc corresponding thereto are stored in the storage device 34 as correlation information Ir in succession. As described above, the precombustion-chamber gas supply amount calculation device 30 generates the correlation information Ir real-time during operation of the gas engine 100, and updates the correlation information Ir stored in the storage device 34, on the basis of the information obtained by feedback.

With the above gas engine 100, it is possible to determine the precombustion-chamber gas supply amount real-time so as to achieve the highest thermal efficiency taking into account the torch strength information St within such a range that the combustion variation amount Vc does not exceed the standard variation amount. Thus, for instance, even if the state of fuel gas (e.g. heat quantity) changes due to variation of composition of fuel gas or temperature change, it is possible to control the precombustion-chamber gas supply pressure so as to maintain a high thermal efficiency constantly while operating the gas engine.

Figure 6:
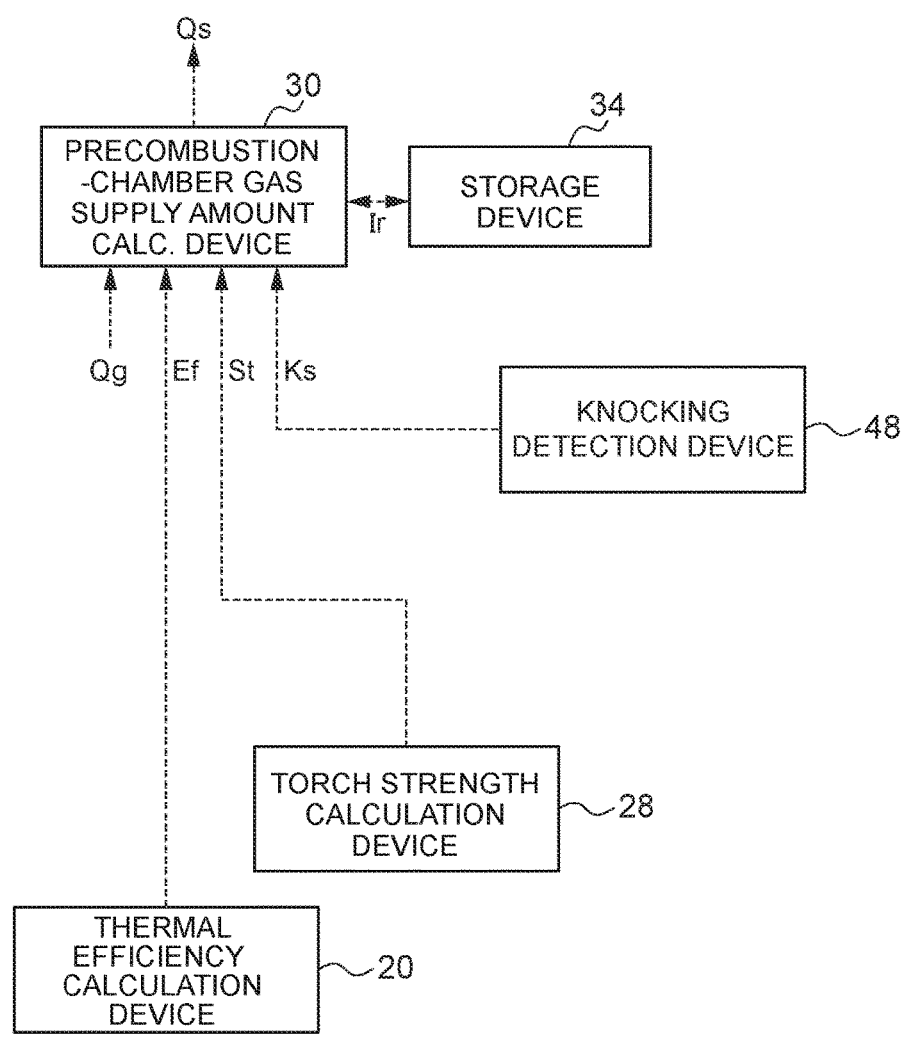
FIG. 6 is a schematic configuration diagram of a part of a precombustion-chamber type gas engine 100 according to an embodiment.

In an embodiment, as shown in FIG. 6, the precombustion-chamber gas supply amount calculation device 30 is configured to calculate the precombustion-chamber gas supply amount so that the thermal efficiency becomes highest within such a range that the state of knocking Ks does not deteriorate from a standard state, on the basis of the state of knocking Ks detected by the knocking detection device 48 provided for the gas engine 100, the torch strength information St obtained by the torch strength information acquisition device 28, and the correlation information Ir. In this case, the correlation information Ir is information representing a correlation between the torch strength information St, the thermal efficiency Ef, the precombustion-chamber gas supply amount Qs, and the state of knocking Ks.

The knocking detection device 48 detects the strength of knocking and the occurrence frequency on the basis of the vibration state inside the in-cylinder pressure (vibration state at a predetermined frequency range). In this case, "the state of knocking Ks does not deteriorate from the standard state" means that the strength or occurrence frequency of knocking is not greater than a standard value.

With the above configuration, even in a configuration in which fuel gas is supplied to the precombustion chamber through the check valve 14, it is possible to control the precombustion-chamber gas supply pressure so as to achieve a torch strength that realizes the highest thermal efficiency within such a range that the state of knocking does not deteriorate from the standard state. Accordingly, it is possible to operate the engine efficiently while suppressing damage to the gas engine 100.

In the embodiment shown in FIG. 6, the storage device 34 stores the correlation information Ir representing a correlation between the torch strength information St, the thermal efficiency Ef, the precombustion-chamber gas supply amount Qs, and the state of knocking Ks. Further, the precombustion-chamber gas supply amount calculation device 30 receives the precombustion-chamber gas amount Qg from the precombustion-chamber gas amount calculation device 26, the torch strength information St from the torch strength information acquisition device 28, and the correlation information Ir from the storage device 34, and thereby feedbacks a precombustion-chamber gas supply amount Qs for achieving the highest thermal efficiency within such a range that the state of knocking Ks does not deteriorate from the standard state. Further, the precombustion-chamber gas supply amount Qs obtained by feedback, as well as the thermal efficiency Ef, the torch strength information St, and the state of knocking Ks corresponding thereto are stored in the storage device 34 as correlation information Ir in succession. As described above, the precombustion-chamber gas supply amount calculation device 30 generates the correlation information Ir real-time during operation of the gas engine 100, and updates the correlation information Ir stored in the storage device 34, on the basis of the information obtained by feedback.

With the above gas engine 100, it is possible to determine the precombustion-chamber gas supply amount Qs real-time so as to achieve the highest thermal efficiency taking into account the torch strength information St within such a range that the state of knocking Ks does not deteriorate from the standard state. Thus, it is possible to control the precombustion-chamber gas supply pressure so as to maintain a high thermal efficiency constantly while operating the gas engine and suppressing damage to the gas engine.

Figure 7:
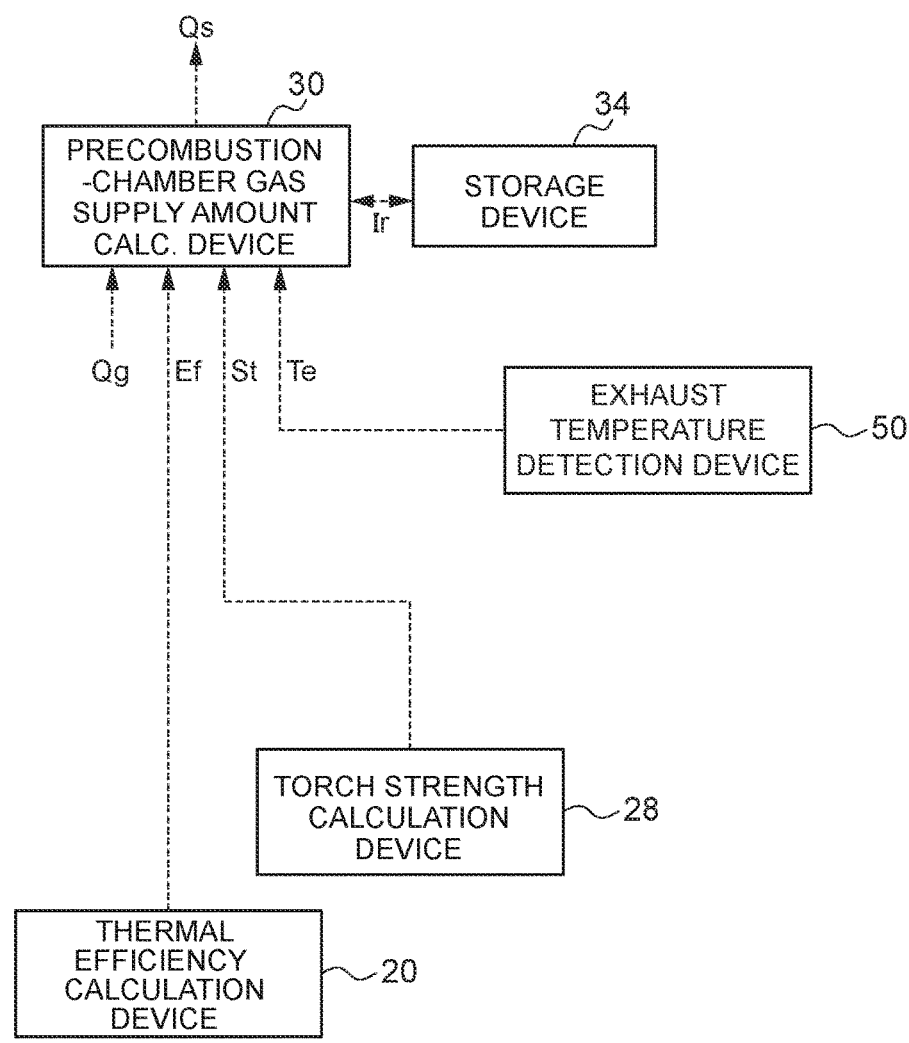
FIG. 7 is a schematic configuration diagram of a part of a precombustion-chamber type gas engine 100 according to an embodiment.

In an embodiment, as shown in FIG. 7, the precombustion-chamber gas supply amount calculation device 30 is configured to calculate the precombustion-chamber gas supply amount so that the thermal efficiency becomes highest within such a range that the exhaust temperature Te satisfies a predetermined standard, on the basis of the temperature Te of exhaust gas from the main chamber 6 detected by the exhaust temperature detection device 50 provided for the gas engine 100, the torch strength information St obtained by the torch strength information acquisition device 28, and the correlation information Ir. In this case, the correlation information Ir is information representing a correlation between the torch strength information St, the thermal efficiency Ef, the precombustion-chamber gas supply amount Qs, and the exhaust temperature Te.

With the above configuration, even in a configuration in which fuel gas is supplied to the precombustion chamber through the check valve 14, it is possible to control the precombustion-chamber gas supply pressure so as to achieve a torch strength that realizes the highest thermal efficiency within such a range that the exhaust temperature Te satisfies a predetermined standard. Accordingly, it is possible to operate the engine efficiently while suppressing troubles that may be caused by the exhaust temperature.

In the embodiment shown in FIG. 7, the storage device 34 stores the correlation information Ir representing a correlation between the torch strength information St, the thermal efficiency Ef, the precombustion-chamber gas supply amount Qs, and the exhaust temperature Te. Further, the precombustion-chamber gas supply amount calculation device 30 receives the precombustion-chamber gas amount Qg from the precombustion-chamber gas amount calculation device 26, the torch strength information St from the torch strength information acquisition device 28, and the correlation information Ir from the storage device 34, and thereby feedbacks a precombustion-chamber gas supply amount Qs for achieving the highest thermal efficiency within such a range that the exhaust temperature Te satisfies a predetermined standard. Further, the precombustion-chamber gas supply amount Qs obtained by feedback, as well as the thermal efficiency Ef, the torch strength information St, and the exhaust temperature Te corresponding thereto are stored in the storage device 34 as correlation information Ir in succession. As described above, the precombustion-chamber gas supply amount calculation device 30 generates the correlation information Ir real-time during operation of the gas engine 100, and updates the correlation information Ir stored in the storage device 34, on the basis of the information obtained by feedback.

With the above gas engine 100, it is possible to determine the precombustion-chamber gas supply amount Qs real-time so as to achieve the highest thermal efficiency taking into account the torch strength information St within such a range that the exhaust temperature Te satisfies a predetermined standard. Thus, for instance, even if the state of fuel gas (e.g. heat quantity) changes due to variation of composition of fuel gas or temperature change, it is possible to control the precombustion-chamber gas supply pressure so as to maintain a high thermal efficiency constantly while operating the gas engine.

Figure 8:
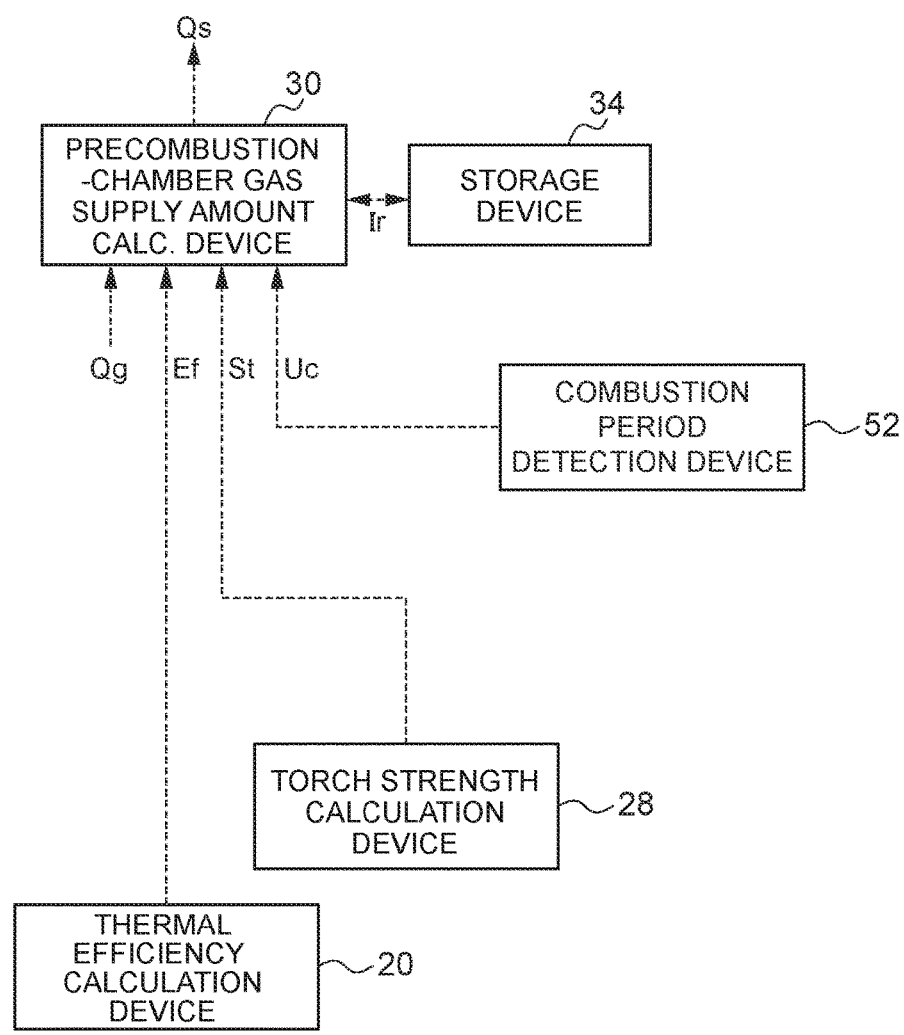
FIG. 8 is a schematic configuration diagram of a part of a precombustion-chamber type gas engine 100 according to an embodiment.

In an embodiment, as shown in FIG. 8, the precombustion-chamber gas supply amount calculation device 30 is configured to calculate the precombustion-chamber gas supply amount so that the thermal efficiency becomes highest within such a range that the combustion period Uc satisfies a predetermined standard, on the basis of the combustion period Uc of the main chamber 6 detected by the combustion period detection device 52 provided for the gas engine 100, the torch strength information St obtained by the torch strength information acquisition device 28, and the correlation information Ir. In this case, the correlation information Ir is information representing a correlation between the torch strength information St, the thermal efficiency Ef, the precombustion-chamber gas supply amount Qs, and the combustion period Uc.

With the above configuration, even in a configuration in which fuel gas is supplied to the precombustion chamber through the check valve 14, it is possible to control the precombustion-chamber gas supply pressure so as to achieve a torch strength that realizes the highest thermal efficiency within such a range that the combustion period Uc satisfies a predetermined standard. Accordingly, it is possible to operate the engine efficiently while suppressing troubles that may be caused by the combustion period.

In the embodiment shown in FIG. 7, the storage device 34 stores the correlation information Ir representing a correlation between the torch strength information St, the thermal efficiency Ef, the precombustion-chamber gas supply amount Qs, and the combustion period Uc. Further, the precombustion-chamber gas supply amount calculation device 30 receives the precombustion-chamber gas amount Qg from the precombustion-chamber gas amount calculation device 26, the torch strength information St from the torch strength information acquisition device 28, and the correlation information Ir from the storage device 34, and thereby feedbacks a precombustion-chamber gas supply amount Qs for achieving the highest thermal efficiency within such a range that the combustion period Uc satisfies a predetermined standard. Further, the precombustion-chamber gas supply amount Qs obtained by feedback, as well as the thermal efficiency Ef, the torch strength information St, and the combustion period Uc corresponding thereto are stored in the storage device 34 as correlation information Ir in succession. As described above, the precombustion-chamber gas supply amount calculation device 30 generates the correlation information Ir real-time during operation of the gas engine 100, and updates the correlation information Ir stored in the storage device 34, on the basis of the information obtained by feedback.

With the above gas engine 100, it is possible to determine the precombustion-chamber gas supply amount Qs real-time so as to achieve the highest thermal efficiency taking into account the torch strength information St within such a range that the combustion period Uc satisfies a predetermined standard. Thus, it is possible to control the precombustion-chamber gas supply pressure so as to maintain a high thermal efficiency constantly while operating the gas engine and suppressing troubles that may be caused by the combustion period.

Embodiments of the present invention were described in detail above, but the present invention is not limited thereto, and various amendments and modifications may be implemented.

For instance, in some embodiments shown in FIGS. 4 to 8, the precombustion-chamber gas supply amount calculation device 30 calculates the precombustion-chamber gas supply amount so as to achieve the highest thermal efficiency, using one of the NOx discharge amount Dn, the combustion variation amount Vc, the state of knocking Ks, the exhaust temperature Te, or the combustion period Uc as a limiting condition. Nevertheless, the precombustion-chamber gas supply amount calculation device 30 may combine the above limiting conditions flexibly and calculate the precombustion-chamber gas supply amount so as to achieve the highest thermal efficiency under a plurality of limiting conditions.

Furthermore, limiting conditions other than the above limiting conditions may be added. For instance, the precombustion-chamber gas supply amount calculation device 30 may be configured to calculate the precombustion-chamber gas supply amount Qs so as to achieve the highest thermal efficiency within such a range that the in-cylinder pressure does not exceed the standard pressure.

Further, control of the ignition period or the air excess rate may be combined to the above described control of the precombustion-chamber gas supply amount Qs.

Further, in some embodiments described above, the correlation information Ir is generated real-time on the basis of the precombustion-chamber gas supply amount Qs obtained by feedback. Nevertheless, in the present invention, it is not always necessary to feedback the precombustion-chamber gas supply amount Qs, and the correlation information Ir stored in the storage device 34 may not necessarily be updated. In this case, the precombustion-chamber gas supply amount calculation device 30 may use only the correlation information stored in advance in the storage device 34 for calculation of the precombustion-chamber gas supply amount Qs, as the correlation information Ir.

Further, the precombustion-chamber type gas engine 100 may not necessarily include the storage device 34 storing the correlation information Ir. In this case, the precombustion-chamber gas supply amount calculation device 30 may obtain the correlation information Ir from outside the precombustion-chamber type gas engine 100.

DESCRIPTION OF REFERENCE NUMERALS

2 Piston
4 Cylinder head
6 Main chamber
7 Precombustion chamber cap
8 Injection nozzle
10 Precombustion chamber
12 Precombustion-chamber gas supply passage
14 Check valve
16 Supply pressure control valve
17 Ignition plug
18 Valve-open timing and valve-open period detection device
19 Gap sensor
20 Thermal efficiency calculation device
22 Output detection device
24 Fuel gas amount detection device
26 Precombustion-chamber gas amount calculation device
28 Torch strength information acquisition device
30 Precombustion-chamber gas supply amount calculation device
32 Precombustion-chamber gas supply pressure control device
34 Storage device
36 Main chamber inner pressure detection device
38 Precombustion chamber inner pressure detection device
40 Torch strength calculation device
42 Differential pressure sensor
44 NOx discharge amount detection device
46 Combustion variation amount detection device
48 Knocking detection device
50 Exhaust temperature detection device
52 Combustion period detection device
100 Gas engine
Dn Discharge amount
Ef Thermal efficiency
Ir Correlation information
Ks State of knocking
L Distance
Pm, Ps Pressure
Qg Precombustion-chamber gas amount
Qs Precombustion-chamber gas supply amount
St Torch strength information
Te Exhaust temperature
Uc Combustion period
Vc Combustion variation amount

The invention claimed is:

1. A precombustion-chamber type gas engine, comprising:
    a main chamber defined between a piston and a cylinder head;
    a precombustion chamber which is in communication with the main chamber via an injection nozzle;
    a precombustion-chamber gas supply passage capable of supplying fuel gas to the precombustion chamber from a supply source of the fuel gas not via the main chamber;
    a check valve disposed in the precombustion-chamber gas supply passage;
    a supply pressure control valve which is disposed on an upstream side of the check valve in the precombustion-chamber gas supply passage and which is capable of adjusting a pressure of the fuel gas to be supplied to the precombustion chamber;
    a torch strength information acquisition device configured to obtain torch strength information correlated to strength of a torch from the injection nozzle, on the basis of a pressure in the main chamber and a pressure in the precombustion chamber;
    a precombustion-chamber gas supply amount calculation device configured to calculate an amount of the fuel gas to be supplied to the precombustion chamber from the precombustion-chamber gas supply passage (hereinafter, referred to as precombustion-chamber gas supply amount), on the basis of the torch strength information obtained by the torch strength information acquisition device and correlation information representing a correlation between the torch strength information, a thermal efficiency, and the precombustion-chamber gas supply amount; and
    a precombustion-chamber gas supply pressure control device configured to control the supply pressure control valve on the basis of the precombustion-chamber gas supply amount calculated by the precombustion-chamber gas supply amount calculation device.

2. The precombustion chamber type gas engine according to claim 1,
    wherein the torch strength information acquisition device is configured to obtain the torch strength information on the basis of a difference or a ratio between the pressure in the main chamber and the pressure in the precombustion chamber.

3. The precombustion chamber type gas engine according to claim 1,
    further comprising a NOx amount detection device configured to detect a NOx discharge amount,
    wherein the correlation information is information representing a correlation between the torch strength information, the thermal efficiency, the precombustion-chamber gas supply amount, and the NOx discharge amount, and
    wherein the precombustion-chamber gas supply amount calculation device is configured to calculate the precombustion-chamber gas supply amount within such a range that the NOx discharge amount does not exceed a standard discharge amount, on the basis of the NOx discharge amount detected by the NOx amount detection device, the torch strength information obtained by the torch strength information acquisition device, and the correlation information.

4. The precombustion chamber type gas engine according to claim 1,
further comprising a combustion variation amount detection device configured to detect a combustion variation amount in the main chamber,
wherein the correlation information is information representing a correlation between the torch strength information, the thermal efficiency, the precombustion-chamber gas supply amount, and the combustion variation amount, and
wherein the precombustion-chamber gas supply amount calculation device is configured to calculate the precombustion-chamber gas supply amount within such a range that the combustion variation amount does not exceed a standard variation amount, on the basis of the combustion variation amount detected by the combustion variation amount detection device, the torch strength information obtained by the torch strength information acquisition device, and the correlation information.

5. The precombustion chamber type gas engine according to claim 1,
further comprising a knocking detection device configured to detect a state of knocking,
wherein the correlation information is information representing a correlation between the torch strength information, the thermal efficiency, the precombustion-chamber gas supply amount, and the state of knocking, and
wherein the precombustion-chamber gas supply amount calculation device is configured to calculate the precombustion-chamber gas supply amount within such a range that the state of knocking does not deteriorate from a standard state, on the basis of the state of knocking detected by the knocking detection device, the torch strength information obtained by the torch strength information acquisition device, and the correlation information.

6. The precombustion chamber type gas engine according to claim 1,
further comprising an exhaust temperature detection device configured to detect a temperature of exhaust gas from the main chamber,
wherein the correlation information is information representing a correlation between the torch strength information, the thermal efficiency, the precombustion-chamber gas supply amount, and the temperature of the exhaust gas, and
wherein the precombustion-chamber gas supply amount calculation device is configured to calculate the precombustion-chamber gas supply amount within such a range that the temperature of the exhaust gas satisfies a predetermined standard, on the basis of the temperature of the exhaust gas from the main chamber detected by the exhaust temperature detection device, the torch strength information obtained by the torch strength information acquisition device, and the correlation information.

7. The precombustion chamber type gas engine according to claim 1,
further comprising a combustion period detection device configured to detect a combustion period in the main chamber,
wherein the correlation information is information representing a correlation between the torch strength information, the thermal efficiency, the precombustion-chamber gas supply amount, and the combustion period, and
wherein the precombustion-chamber gas supply amount calculation device is configured to calculate the precombustion-chamber gas supply amount within such a range that the combustion period satisfies a predetermined standard, on the basis of the combustion period detected by the combustion period detection device, the torch strength information obtained by the torch strength information acquisition device, and the correlation information.

8. A method of controlling operation of a precombustion-chamber type gas engine which comprises:
a main chamber defined between a piston and a cylinder head;
a precombustion chamber which is in communication with the main chamber via an injection nozzle;
a precombustion-chamber gas supply passage capable of supplying fuel gas to the precombustion chamber from a supply source of the fuel gas not via the main chamber;
a check valve disposed in the precombustion-chamber gas supply passage; and
a supply pressure control valve which is disposed on an upstream side of the check valve in the precombustion-chamber gas supply passage and which is capable of adjusting a pressure of the fuel gas to be supplied to the precombustion chamber,
the method comprising:
a torch strength information acquisition step of obtaining torch strength information correlated to strength of a torch from the injection nozzle, on the basis of a pressure in the main chamber and a pressure in the precombustion chamber;
a precombustion-chamber gas supply amount calculation step of calculating an amount of the fuel gas to be supplied to the precombustion chamber from the precombustion-chamber gas supply passage (hereinafter, referred to as precombustion-chamber gas supply amount), on the basis of the torch strength information obtained by the torch strength information acquisition device and correlation information representing a correlation between the torch strength information, a thermal efficiency, and the precombustion-chamber gas supply amount; and
a precombustion-chamber gas supply pressure control step of controlling the supply pressure control valve on the basis of the precombustion-chamber gas supply amount calculated in the precombustion-chamber gas supply amount calculation step.

9. The method of controlling operation of a precombustion-chamber type gas engine according to claim 8,
wherein the torch strength information acquisition step comprises obtaining the torch strength information on the basis of a difference or a ratio between the pressure in the main chamber and the pressure in the precombustion chamber.

10. The method of controlling operation of a precombustion-chamber type gas engine according to claim 8,
further comprising a NOx amount detection step of detecting a NOx discharge amount, wherein the correlation information is information representing a correlation between the torch strength information, the thermal efficiency, the precombustion-chamber gas supply amount, and the NOx discharge amount, and wherein the precombustion-chamber gas supply amount calculation step comprises calculating the precombustion-chamber gas supply amount within such a range that the NOx discharge amount does not exceed a standard discharge amount, on the basis of the NOx discharge amount detected in the NOx amount detection step, the torch strength information obtained in the torch strength information acquisition step, and the correlation information.

11. The method of controlling operation of a precombustion-chamber type gas engine according to claim 8, further comprising a combustion variation amount detection step of detecting a combustion variation amount in the main chamber, wherein the correlation information is information representing a correlation between the torch strength information, the thermal efficiency, the precombustion-chamber gas supply amount, and the combustion variation amount, and wherein the precombustion-chamber gas supply amount calculation step comprises calculating the precombustion-chamber gas supply amount within such a range that the combustion variation amount does not exceed a standard variation amount, on the basis of the combustion variation amount detected in the combustion variation amount detection step, the torch strength information obtained in the torch strength information acquisition step, and the correlation information.

12. The method of controlling operation of a precombustion-chamber type gas engine according to claim 8, further comprising a knocking detection step of detecting a state of knocking, wherein the correlation information is information representing a correlation between the torch strength information, the thermal efficiency, the precombustion-chamber gas supply amount, and the state of knocking, and wherein the precombustion-chamber gas supply amount calculation step comprises calculating the precombustion-chamber gas supply amount within such a range that the state of knocking does not deteriorate from a standard state, on the basis of the state of knocking detected in the knocking detection step, the torch strength information obtained in the torch strength information acquisition step, and the correlation information.

13. The method of controlling operation of a precombustion-chamber type gas engine according to claim 8, further comprising an exhaust temperature detection step of detecting a temperature of exhaust gas from the main chamber, wherein the correlation information is information representing a correlation between the torch strength information, the thermal efficiency, the precombustion-chamber gas supply amount, and the temperature of the exhaust gas, and wherein the precombustion-chamber gas supply amount calculation step comprises calculating the precombustion-chamber gas supply amount within such a range that the temperature of the exhaust gas satisfies a predetermined standard, on the basis of the temperature of the exhaust gas from the main chamber detected in the exhaust temperature detection step, the torch strength information obtained in the torch strength information acquisition step, and the correlation information.

14. The method of controlling operation of a precombustion-chamber type gas engine according to claim 8, further comprising a combustion period detection step of detecting a combustion period in the main chamber, wherein the correlation information is information representing a correlation between the torch strength information, the thermal efficiency, the precombustion-chamber gas supply amount, and the combustion period, and wherein the precombustion-chamber gas supply amount calculation step comprises calculating the precombustion-chamber gas supply amount within such a range that the combustion period satisfies a predetermined standard, on the basis of the combustion period detected in the combustion period detection step, the torch strength information obtained in the torch strength information acquisition step, and the correlation information.

* * * * *